(12) United States Patent
Yoshida

(10) Patent No.: US 11,258,920 B2
(45) Date of Patent: Feb. 22, 2022

(54) IMAGE DIAGNOSTIC DEVICE, FAILURE DIAGNOSTIC APPARATUS, AND DIAGNOSTIC METHOD

(71) Applicant: Ricoh Company, Ltd., Tokyo (JP)

(72) Inventor: Atsushi Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/034,918

(22) Filed: Sep. 28, 2020

(65) Prior Publication Data

US 2021/0152706 A1   May 20, 2021

(30) Foreign Application Priority Data

Nov. 19, 2019   (JP) .............................. JP2019-208717

(51) Int. Cl.
*H04N 1/00* (2006.01)
*H04N 1/195* (2006.01)
*G09G 5/00* (2006.01)

(52) U.S. Cl.
CPC ......... *H04N 1/19594* (2013.01); *G09G 5/003* (2013.01); *H04N 1/00015* (2013.01); *H04N 1/00045* (2013.01); *H04N 1/00076* (2013.01)

(58) Field of Classification Search
CPC ........... H04N 1/00015; H04N 1/00045; H04N 1/00076

See application file for complete search history.

(56) References Cited

U.S. PATENT DOCUMENTS

| | | | |
|---|---|---|---|
| 6,366,358 B1 * | 4/2002 | Satou | B41F 33/0036 358/1.14 |
| 2012/0288200 A1 * | 11/2012 | Berkovich | G06K 9/50 382/181 |
| 2013/0207995 A1 | 8/2013 | Yoshida et al. | |
| 2014/0022575 A1 * | 1/2014 | Takebe | H04N 1/00063 358/1.13 |
| 2014/0177016 A1 * | 6/2014 | Wilsher | H04N 1/0005 358/504 |
| 2015/0110505 A1 * | 4/2015 | Takahashi | G03G 15/5062 399/15 |
| 2017/0054876 A1 * | 2/2017 | Matsuzaki | H04N 1/6008 |
| 2017/0064095 A1 * | 3/2017 | Matsuzaki | H04N 1/00029 |
| 2017/0177962 A1 * | 6/2017 | Yamazaki | B41J 29/46 |
| 2017/0195500 A1 * | 7/2017 | Sugimoto | H04N 1/405 |

(Continued)

FOREIGN PATENT DOCUMENTS

| | | | | |
|---|---|---|---|---|
| EP | 3438756 A1 * | 2/2019 | | G03G 15/55 |
| JP | 2005-094220 | 4/2005 | | |

(Continued)

*Primary Examiner* — Ted W Barnes
(74) *Attorney, Agent, or Firm* — Xsensus LLP

(57) ABSTRACT

An image diagnostic device comprising circuitry configured to output a diagnostic chart for image defect detection, read a predetermined reading range of the diagnostic chart, output a read image based on reading of the predetermined reading range, detect an image defect in the diagnostic chart based on the read image, and determine whether the image defect is at an end of the read image. In response to a determination that the image defect is at the end of the read image, the circuitry controls rereading to read a rereading range of the diagnostic chart different from the predetermined reading range.

20 Claims, 13 Drawing Sheets

(56) References Cited

U.S. PATENT DOCUMENTS

| | | | |
|---|---|---|---|
| 2017/0244853 A1 | 8/2017 | Yabuuchi et al. | |
| 2017/0318172 A1* | 11/2017 | Matsuzaki | H04N 1/00721 |
| 2017/0374207 A1* | 12/2017 | Fujiki | H04N 1/00015 |
| 2018/0139345 A1 | 5/2018 | Goh et al. | |
| 2018/0165834 A1 | 6/2018 | Sekiguchi et al. | |
| 2018/0198958 A1 | 7/2018 | Yoshida | |
| 2019/0045068 A1* | 2/2019 | Tanaka | H04N 1/00063 |
| 2019/0163418 A1* | 5/2019 | Sugahara | H04N 1/00039 |
| 2019/0238686 A1* | 8/2019 | Sakatani | H04N 1/00045 |
| 2019/0281171 A1* | 9/2019 | Hayashi | G06K 9/46 |
| 2019/0286033 A1 | 9/2019 | Hayashi | |
| 2019/0295281 A1 | 9/2019 | Yamada et al. | |
| 2019/0347496 A1 | 11/2019 | Takahashi et al. | |
| 2020/0068081 A1* | 2/2020 | Ku | H04N 1/00005 |
| 2020/0074212 A1 | 3/2020 | Amano et al. | |
| 2020/0089151 A1* | 3/2020 | Yoshino | G03G 15/5062 |
| 2020/0301336 A1* | 9/2020 | Tsuchiya | G03G 15/5033 |
| 2020/0358916 A1* | 11/2020 | Tomii | H04N 1/0057 |
| 2021/0104030 A1* | 4/2021 | Itou | G01N 21/8851 |

FOREIGN PATENT DOCUMENTS

| | | | |
|---|---|---|---|
| JP | 2008-028698 | | 2/2008 |
| JP | 2008028698 A | * | 2/2008 |
| JP | 2016-072693 | | 5/2016 |
| JP | 2019-158994 | | 9/2019 |

* cited by examiner

IMAGE DIAGNOSTIC DEVICE, FAILURE DIAGNOSTIC APPARATUS, AND DIAGNOSTIC METHOD

CROSS-REFERENCE TO RELATED APPLICATION

This patent application is based on and claims priority pursuant to 35 U.S.C. § 119(a) to Japanese Patent Application No. 2019-208717, filed on Nov. 19, 2019, in the Japan Patent Office, the entire disclosure of which is hereby incorporated by reference herein.

BACKGROUND

Technical Field

The present disclosure relates to an image diagnostic device, a failure diagnostic apparatus, and a diagnostic method.

Related Art

There is a technique of reading, with a scanner, an internal pattern printed by an image forming apparatus, and determining, from image data thus read, the presence or absence of abnormality of the image forming apparatus that has printed the image.

SUMMARY

An embodiment of this disclosure provides an image diagnostic device including circuitry configured to output a diagnostic chart for image defect detection, read a predetermined reading range of the diagnostic chart, output a read image based on reading of the predetermined reading range, detect an image defect in the diagnostic chart based on the read image, and determine whether the image defect is at an end of the read image. In response to a determination that the image defect is at the end of the read image, the circuitry controls rereading to read a rereading range of the diagnostic chart different from the predetermined reading range.

Another embodiment provides a diagnostic method that includes outputting a diagnostic chart for image defect detection, reading a predetermined reading range of the diagnostic chart, outputting a read image based on reading of the predetermined reading range, detecting an image defect in the diagnostic chart based on the read image, determining whether the image defect is at an end of the read image, and controlling rereading to read a rereading range of the diagnostic chart different from the predetermined reading range in response to a determination that the image defect is at the end of the read image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
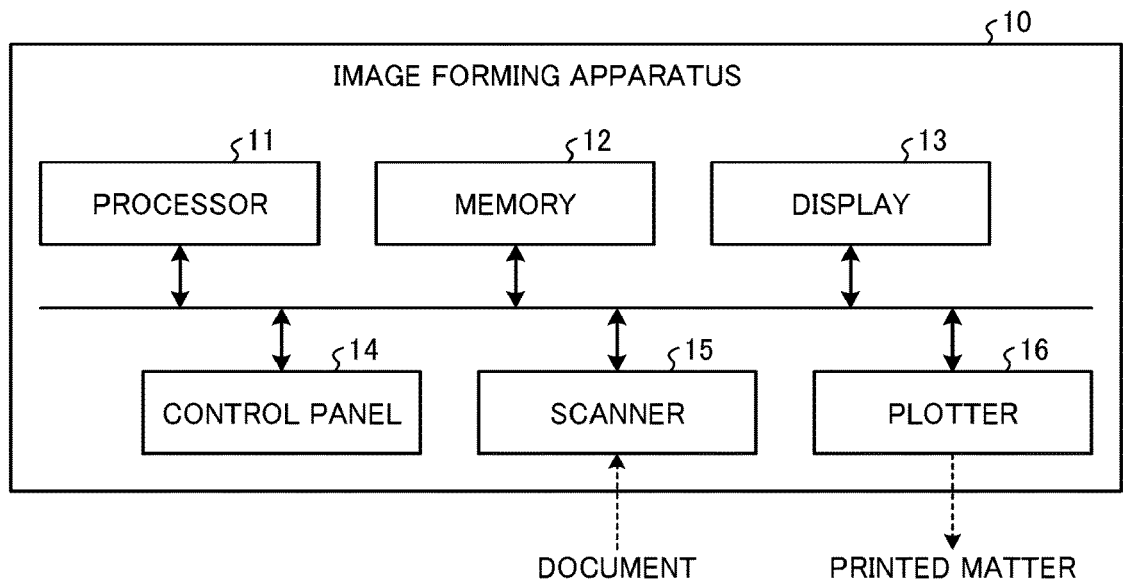
FIG. 1 is a schematic view of an example of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Copiers include a reading device. A reading device employing a one-dimensional sensor moves a document (e.g., an original) to be read and the one-dimensional sensor relatively to each other in a direction orthogonal to a scanning direction of the one-dimensional sensor, thereby reading the entire document. To relatively move the document and the one-dimensional sensor, roughly speaking, either the document is moved without moving the one-dimensional sensor or the one-dimensional sensor is moved without moving the document. In addition, there are two method of moving the document: a method of automatically moving the document using an automatic document feeder (ADF) and a method of manually moving the document by a user.

Hereinafter, regarding the reading methods of moving a document without moving the one-dimensional sensor, a method of reading the document while manually moving the document is referred to as manual conveyed-document reading, and a method of reading the document while automatically moving the original with the ADF is referred to as ADF conveyed-document reading. Further, regarding the reading methods of moving the one-dimensional sensor without moving the document, a method of reading a stationary document manually placed on an image reading face is referred to as manual stationary-document reading, and a method of reading a stationary document that is automatically fed onto the document reading face by the ADF is referred to as ADF stationary-document reading.

Referring now to the drawings, wherein like reference numerals designate identical or corresponding parts throughout the several views thereof, an image diagnostic device, a failure diagnostic apparatus, and a failure diagnostic method according to embodiments of this disclosure are described. As used herein, the singular forms "a," "an," and "the" are intended to include the plural forms as well, unless the context clearly indicates otherwise.

A first embodiment is described below.

FIG. 1 is a schematic view of an example of a configuration of an image forming apparatus 10 according to the present embodiment. As illustrated in FIG. 1, the image forming apparatus 10 includes a processor 11, a memory 12, a display 13, a control panel 14, a scanner 15, and a plotter 16. The processor 11, the memory 12, the display 13, the control panel 14, the scanner 15, and the plotter 16 are connected to each other via a bus or the like.

The processor 11 entirely controls the operation of the image forming apparatus 10. The processor 11 executes a control program stored, for example, in the memory 12, to control the operation of the image forming apparatus 10. The processor 11 can be, for example, a central processing unit (CPU). Alternatively, processor 11 can be a graphics processing unit (GPU), an application-specific integrated circuit (ASIC), a field-programmable gate array (FPGA), or the like.

The memory 12 includes a nonvolatile memory that stores various kinds of data such as programs, and a volatile memory that functions as a work area for the processor 11 to perform various calculations. As the nonvolatile memory, various storage media such as a read only memory (ROM), a hard disk drive (HDD), a sum of squared differences (SSD), and a flash memory can be used. A random access memory (RAM) can be used as the volatile memory.

The display 13 and the control panel 14 function as a user interface. The display 13 displays the processing status and the like of the image forming apparatus 10 to the user. As the display 13, various displays such as a liquid crystal display (LCD) and an organic electro luminescence (EL) display can be used. The control panel 14 receives inputs from a user. As the control panel 14, various input devices, such as, an input button, a keyboard, and a touch panel, for a user to input can be used.

The scanner 15 optically scans a document S (e.g., a diagnostic chart) and reads contents of the document S. The scanner 15 outputs a read image that is image data of the read document S. The read image is, for example, processed by the processor 11 (image processing).

Figure 2:
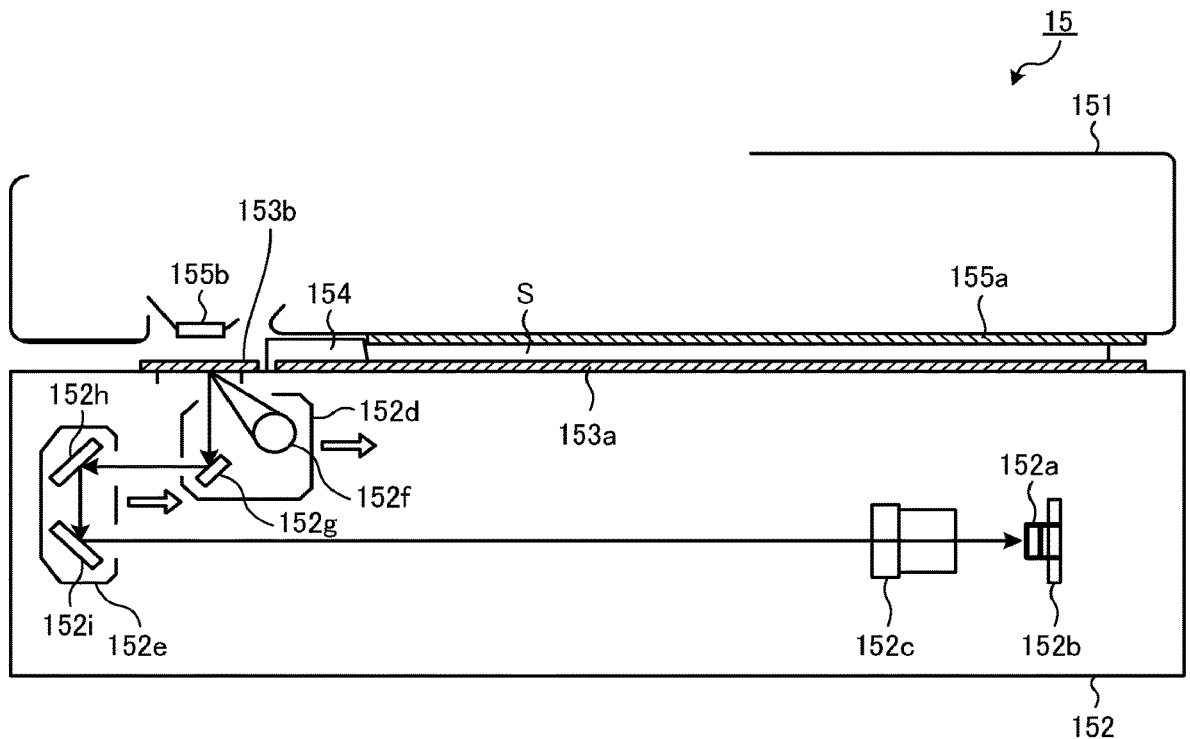
FIG. 2 is a schematic view illustrating an example of a configuration of a scanner illustrated in FIG. 1.

FIG. 2 is a schematic diagram illustrating an example of a configuration of the scanner 15 in FIG. 1. As illustrated in FIG. 2, the scanner 15 according to the present embodiment is a platen scanner that reads a stationary document manually placed (manual stationary-document reading). As illustrated in FIG. 2, the scanner 15 includes a cover 151, a reduction optical system 152, an exposure glass 153a, a reference white board 154, and a background board 155a. The exposure glass 153a and the reference white board 154 are disposed on the upper face of the reduction optical system 152. The document S to be read such as a diagnostic chart is placed on the exposure glass 153a. The background board 155a is disposed on the exposure glass 153a side of the cover 151. The cover 151 is coupled to the housing of the reduction optical system 152 so as to open and close. The background board 155a presses the document S against the exposure glass 153a when the cover 151 is closed. The reduction optical system 152 includes a sensor board 152b including an image sensor 152a such as a charge-coupled device (CCD). The reduction optical system 152 further includes a lens 152c, a first carriage 152d, and a second carriage 152e. The first carriage 152d includes a light emitting diode (LED) light source 152f and a mirror 152g. The second carriage 152e includes mirrors 152h and 152i.

In the reading operation of the scanner 15, the first carriage 152d and the second carriage 152e move from standby positions (home positions) illustrated in FIG. 2 in the sub-scanning direction. While the first carriage 152d and the second carriage 152e are moving, the LED light source 152f emits light to the upper side, that is, toward the exposure glass 153a. The first carriage 152d and the second carriage 152e form an image of the reflected light from the document S on the image sensor 152a via the mirrors 152g, 152h, and 152i and the lens 152c. The image sensor 152a photoelectrically converts the received reflected light from the document S and outputs an analog signal. The output analog signal is converted into a digital signal by an analog-to-digital (A/D) converter. The digital signal is stored in the memory 12. Further, the scanner 15 reads the reflected light from the background boards 155a and 155b and the reference white board 154, and performs gain adjustment and shading correction.

The plotter 16 performs printing according to image data that has been processed (image processing) by the processor 11, for example, and generates a printed matter (document S or diagnostic chart).

Figure 3:
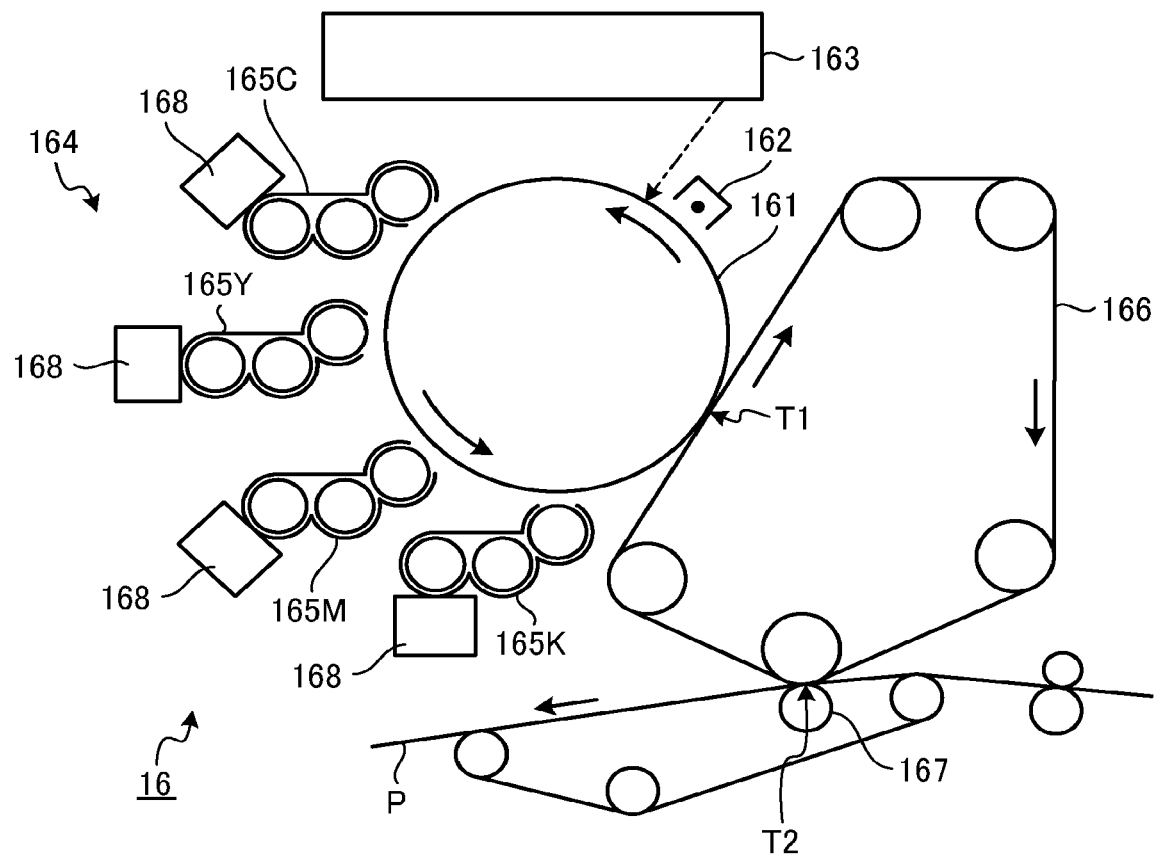
FIG. 3 is a schematic view illustrating an example of a configuration of a printer engine mounted on a plotter illustrated in FIG. 1.

FIG. 3 is a schematic view illustrating an example of a configuration of a printer engine mounted on the plotter 16 illustrated in FIG. 1. As illustrated in FIG. 3, the printer engine includes a photoconductor drum 161, a charging device 162, an optical writing device 163, a developing device 164, an intermediate transfer belt 166, and a transfer device 167. The photoconductor drum 161 is an image bearer that rotates counterclockwise in the drawing. The charging device 162 is disposed opposite the photoconductor drum 161 and charges the outer surface of the photoconductor drum 161. The optical writing device 163 is an exposure device that uses a semiconductor laser or the like. The intermediate transfer belt 166, which is an intermediate transfer body, is disposed in contact with the photoconductor drum 161 at a primary transfer position T1 of the photoconductor drum 161. The intermediate transfer belt 166 rotates clockwise in the drawing. The transfer device 167 is disposed in contact with the intermediate transfer belt 166 at a secondary transfer position T2, and transfers the toner image formed on the intermediate transfer belt 166 onto a recording medium P. At the time of image formation by the printer engine, the charging device 162 uniformly charges the outer surface of the photoconductor drum 161. Then, the optical writing device 163 directs laser light, corresponding to image data processed by the processor 11, to the uniformly charged outer surface of the photoconductor drum 161. Thus, an electrostatic latent image is formed on the outer surface of the photoconductor drum 161. The developing device 164 develops the electrostatic latent image with toner into a toner image.

As illustrated in FIG. 2, the developing device 164 includes a developing device 165K containing black (K) toner, a developing device 165M containing magenta (M) toner, a developing device 165Y containing yellow (Y) toner, and a developing device 165C containing cyan (C) toner, respectively for the four colors (also collectively "developing devices 165"). A development switching mechanism 168 is coupled to each of the developing devices 165K, 165M, 165Y, and 165C. The development switching mechanism 168 prevents color mixture due to transfer of toner from another developing device 165 to the photoconductor drum 161 when one developing device 165 is in operation. The development switching mechanism 168 moves away the developing devices 165 that are not in operation from the surface of the photoconductor drum 161 to the extent that the toner does not contact the photoconductor drum 161. That is, each of the developing devices 165K, 165M, 165Y, and 165C respectively containing cyan, yellow, magenta, and black toner is moved, with the development switching mechanism 168, one by one to a developing position opposite the photoconductor drum 161. For example, the developing device 165C for cyan as a first color is placed at the developing position to apply cyan toner to the electrostatic latent image on the photoconductor drum 161, thereby developing the latent image into a cyan toner image. The developed cyan toner image is primarily transferred from the photoconductor drum 161 onto the intermediate transfer belt 166. Such a primary transfer process is sequentially performed for the other three colors, that is, yellow, magenta, and black. Then, the four color toner images are superimposed on the intermediate transfer belt 166.

Figure 4:
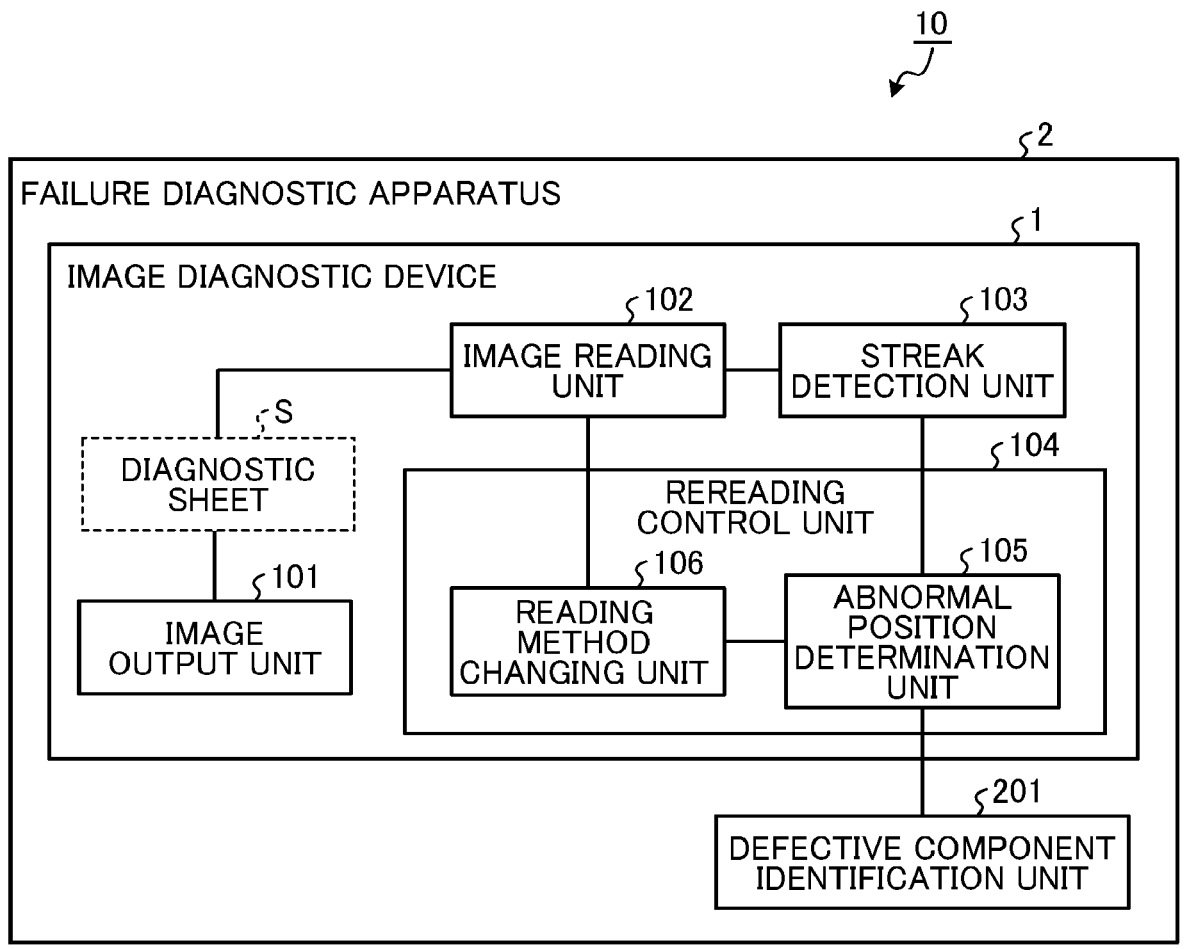
FIG. 4 is a block diagram illustrating an example of a functional configuration of an image diagnostic device and a failure diagnostic apparatus implemented in the image forming apparatus illustrated in FIG. 1.

FIG. 4 is a block diagram illustrating an example of a functional configuration of an image diagnostic device 1 and a failure diagnostic apparatus 2 implemented in the image forming apparatus 10 illustrated in FIG. 1. The processor 11 executes an image diagnostic program stored in a ROM or the like of the memory 12, to implement functions of the image diagnostic device 1. The processor 11 further executes a failure diagnosis program stored in the ROM or the like of the memory 12, to implement functions of the failure diagnostic apparatus 2.

As illustrated in FIG. 4, the function of the failure diagnostic apparatus 2 includes the functions of the image diagnostic device 1 and a defective component identification unit 201. The functions of the image diagnostic device 1 include functions of an image output unit 101, an image reading unit 102, a streak detection unit 103, and a rereading control unit 104.

The image output unit 101 outputs a diagnostic chart (document S) for failure diagnosis when the user instructs execution of failure diagnosis. The diagnostic chart for failure diagnosis is an example of a diagnostic chart for image defect detection. As the diagnostic chart, various charts that facilitate failure diagnosis can be used. An example thereof is a chart evenly applied with a colorant over the entire surface.

The image reading unit 102 reads the diagnostic chart. The image reading unit 102 outputs a read image (image data) of the diagnostic chart (document S) thus read.

The streak detection unit 103 detects an image defect such as a streak from the read image. The term "image defect" used here represents, for example, a vertical stripe (line) which is present in the read image but not present in the document. The streak detection unit 103 is an example of a detection unit. Various methods can be used to detect streaks.

Examples of image defects include a vertical black (color) stripe (line), a vertical black (color) band, a vertical white (color) stripe (line), a vertical white (color) band, toner loss, black (color) spots, white spots, low density, background stain (background fog), afterimage, offset, density unevenness in a sub-scanning direction (horizontal line/band), and density unevenness in a main scanning direction (lateral density unevenness). In this specification, the stripe is linear, constant in width, long, and narrow. Toner loss is peeling off of toner, and black or white spots are black or white dots. The background stain is a stain caused by the toner that, for some reason, adheres to a position where the toner is not to be present. Afterimage/offset is a phenomenon that a previously printed image remains and appears lightly. The density unevenness is that the image density is not uniform such that a part of an output image is darker, and another part of the output image is lighter.

The rereading control unit 104 controls rereading. The rereading is reading a range of the diagnostic chart different from a predetermined reading range thereof when an image defect is detected at an end of the read image. The rereading control unit 104 includes functions of an abnormal position determination unit 105 and a reading method changing unit 106.

The abnormal position determination unit 105 determines the position of the image defect detected by the streak detection unit 103. Specifically, the abnormal position determination unit 105 determines whether or not the detected streak extends from the upper end (edge) of the read image. In addition, the abnormal position determination unit 105 determines whether or not the detected streak extends from the upper end (edge) of the document S (diagnostic chart).

The reading method changing unit 106 changes the reading method of the diagnostic chart when the position of the image defect is within a predetermined range. Specifically, the reading method changing unit 106 changes, according to the rereading range, the reading range of the document mount face, to be read by the image reading unit 102 to acquire a read image.

The defective component identification unit 201 identifies a defective component based on the output of the image diagnostic device 1. Specifically, the defective component identification unit 201 identifies the defective component based on whether or not the position of occurrence of the image defect is an end of the diagnostic chart (document S). Whether the position of the image defect is an end of the diagnostic chart (document S) is whether the image defect is included in a non-image area S2 (see FIG. 7).

The image diagnostic program and the failure diagnostic program can be configured as one program, or two or more programs.

Although the main functions according to the present embodiment are illustrated in FIG. 4 for simplification of description, the functions of the image forming apparatus 10 are not limited thereto.

Descriptions are given of operations of the image diagnostic device 1 and the failure diagnostic apparatus 2 according to the embodiment with reference to the drawings.

Figure 5:
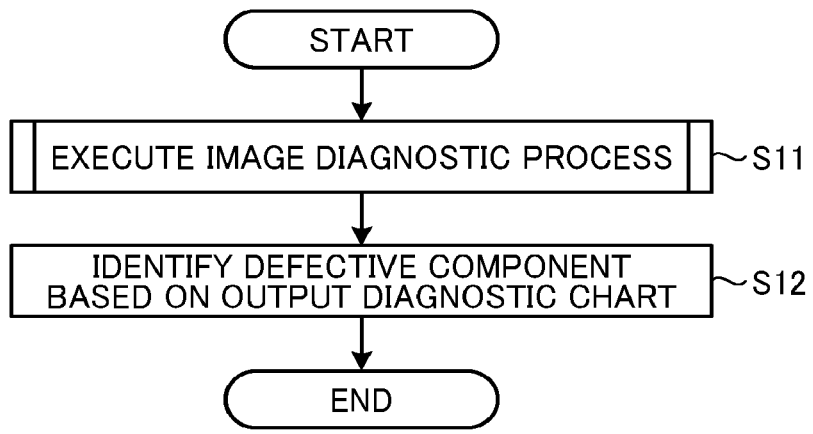
FIG. 5 is a flowchart illustrating an example of a failure diagnostic process executed by the failure diagnostic apparatus illustrated in FIG. 4.

FIG. 5 is a flowchart illustrating an example of a failure diagnostic process executed by the failure diagnostic apparatus 2 illustrated in FIG. 4. The image diagnostic device 1 executes an image diagnostic process in S11. The defective component identification unit 201 identifies the defective component based on the output of the image diagnostic device 1 (specifically, position of the image defect such as a streak) in S12. After the process of S12, the failure diagnostic process ends. Hereinafter, each process of S11 and S12 is described in more detail.

Image Diagnostic Process

Figure 6:
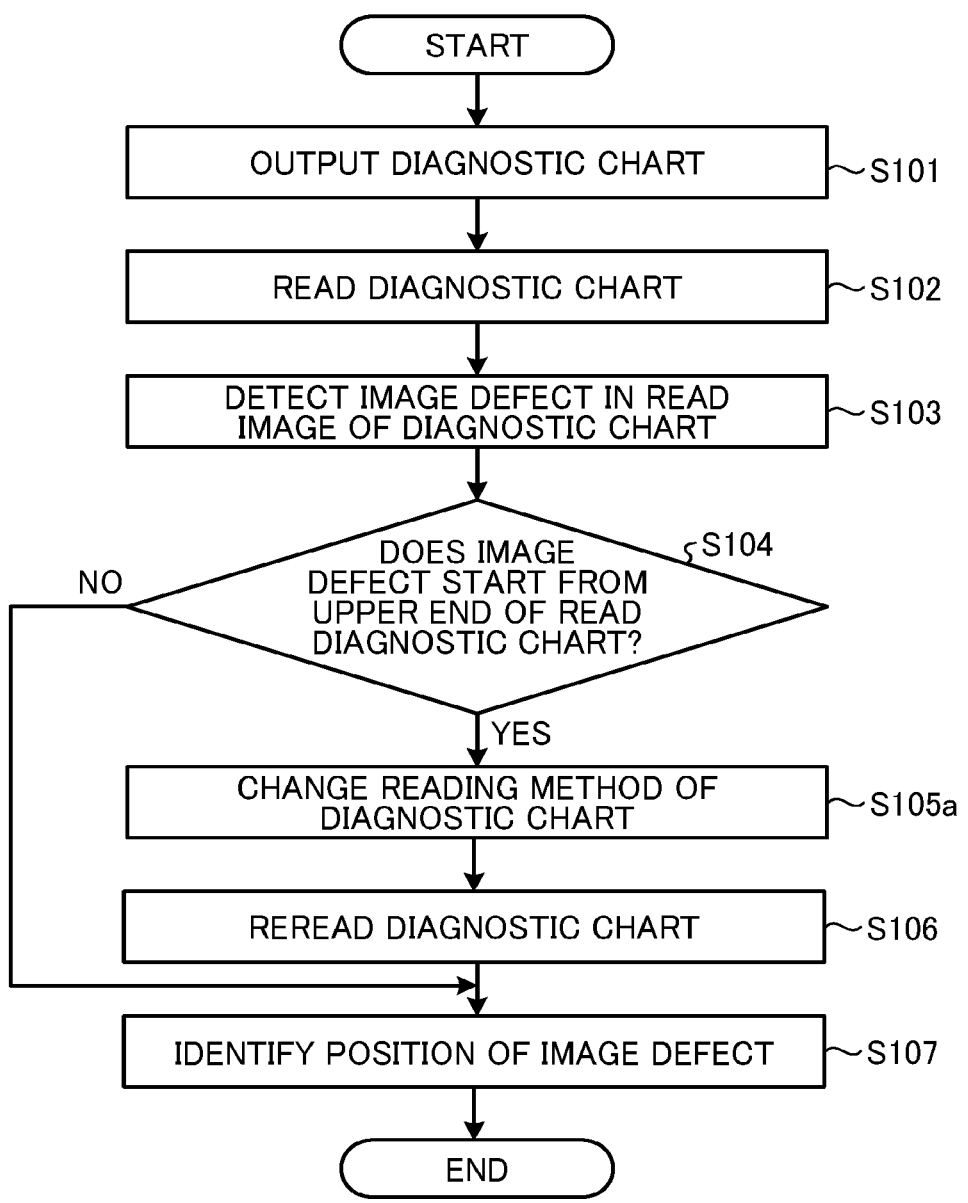
FIG. 6 is a flowchart illustrating an example of an image diagnostic process executed by the image diagnostic device illustrated in FIG. 4.

First, the image diagnostic process executed in S11 illustrated in FIG. 5 is described. FIG. 6 is a flowchart illustrating an example of the image diagnostic process executed by the image diagnostic device 1 illustrated in FIG. 4.

The image output unit 101 outputs a diagnostic chart (document S) for image defect detection, that is, for failure diagnosis, triggered by a failure diagnosis instruction from the user, for example (S101). For example, the user places the output diagnostic chart at a predetermined position on the exposure glass 153a.

The image reading unit 102 reads the predetermined range of the output diagnostic chart (document S) and outputs a read image (image data) of the diagnostic chart (S102). The predetermined range is, for example, a portion of the diagnostic chart within a range of the exposure glass 153 a set as the reading range (also referred to as "document reading range"). A detailed description of the predetermined range is deferred.

The streak detection unit 103 detects an image defect (a streak) from the read image of the diagnostic chart (document S) in S103. When an image defect is detected from the read image of the diagnostic chart, the abnormal position determination unit 105 determines whether or not the detected streak extends from the upper end of the read image (S104). When no image defect is detected from the read image of the diagnostic chart, the image diagnostic process ends.

Figure 7:
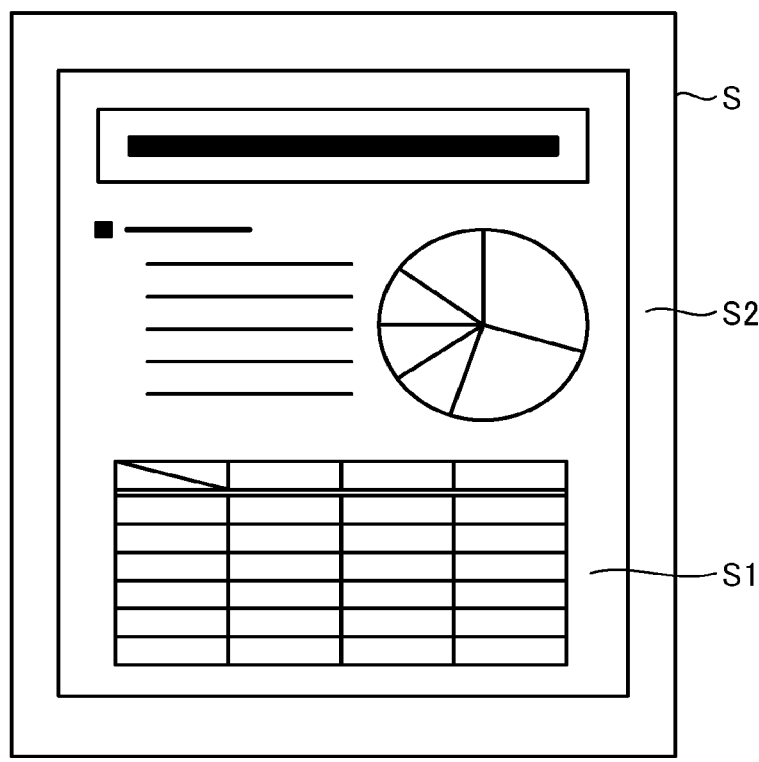
FIG. 7 is a diagram illustrating an example of an image area and a non-image area in a printed matter produced by the image forming apparatus in FIG. 1.

FIG. 7 is a diagram illustrating an example of an image area S1 and the non-image area S2 on a printed matter (document S) produced by the image forming apparatus 10 illustrated in FIG. 1. In general, a printed matter includes the image area S1 and the non-image area S2. Here, the image area S1 is an area to which a colorant is transferred or can be transferred according to the input data at the time of copying or printing. On the other hand, the non-image area S2 is an area generally called a margin, to which the colorant is not transferred or cannot be transferred. In other words, the non-image area S2 is an area in the periphery of the image area S1 of the document S (diagnostic chart).

Figure 8:
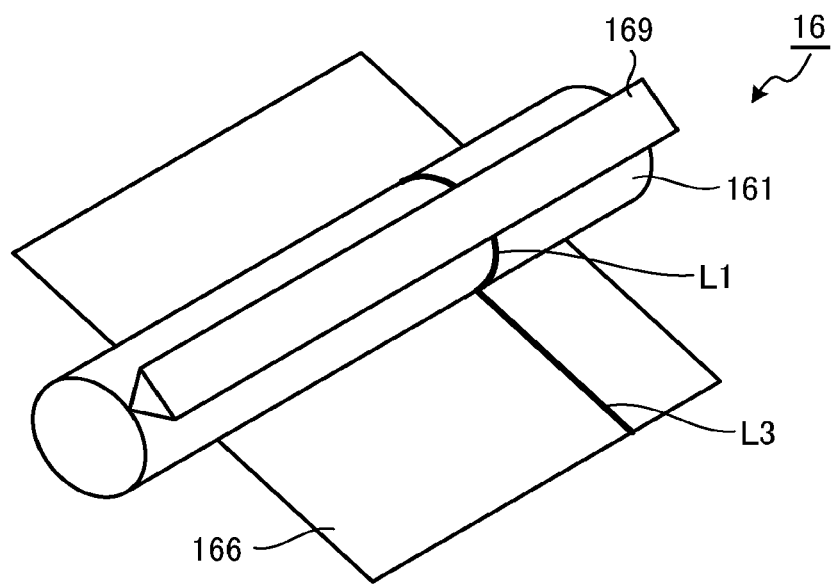
FIG. 8 illustrates an example of an image defect that occurs due to defective cleaning of a photoconductor drum in the image forming apparatus illustrated in FIG. 1.

FIG. 8 illustrates an example of an image defect caused by defective cleaning of the photoconductor drum 161 in the image forming apparatus 10 illustrated in FIG. 1. As described above with reference to FIG. 3, the toner image formed on the photoconductor drum 161 is primarily transferred onto the intermediate transfer belt 166. After the primary transfer, residual toner remaining on the photoconductor drum 161 is removed by a cleaning blade 169, and then the next toner image is formed. However, when the cleaning blade 169 is damaged as illustrated in FIG. 8, the cleaning blade 169 fails to fully remove the residual toner, and the toner remains at a specific position in the main scanning direction. Therefore, a line L1 is constantly formed on the intermediate transfer belt 166 and transferred onto the printed matter as a line L3 (streak).

Figure 9:
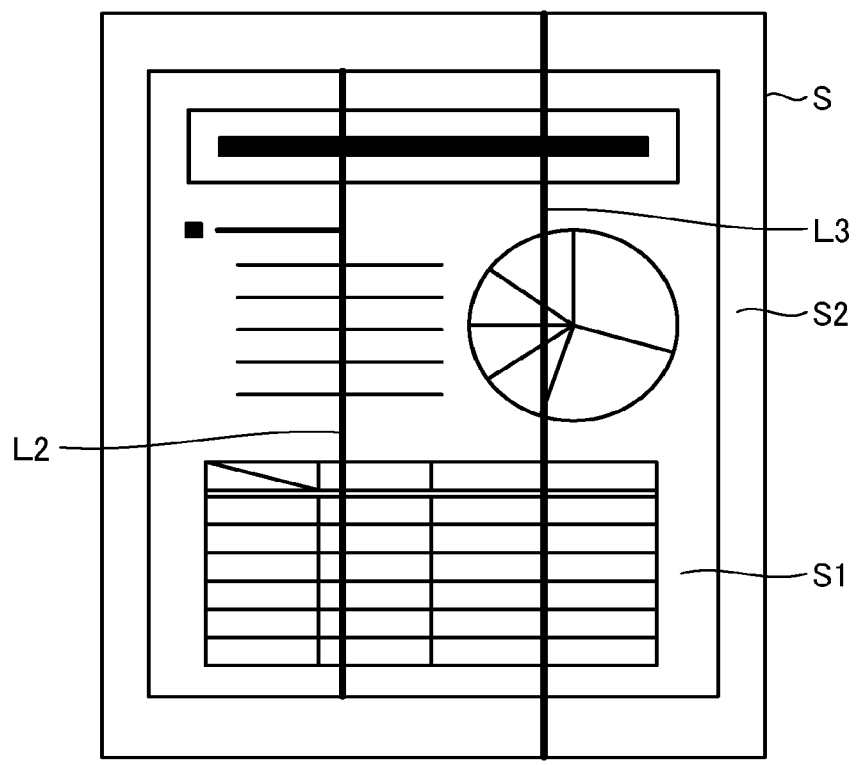
FIG. 9 is a diagram illustrating an example of a difference in image defects (image quality abnormality) caused by a difference in position of a failure in the image forming apparatus illustrated in FIG. 1.

FIG. 9 is a diagram illustrating an example of a difference in image defects (image quality abnormality) caused by a difference in position of a failure in the image forming apparatus 10 illustrated in FIG. 1. As illustrated in FIG. 9, when the cleaning blade 169 is defective, the document S includes an image quality abnormality, such as the line L3, that extends from the end of the printed matter (document S). Therefore, as illustrated in FIG. 9, the image defect is also present in the non-image area S2. On the other hand, when the photoconductor drum 161 or the charging device 162 (e.g., a charging roller) is defective, the image defect does not extend from the end of the print (document S) like a line L2. That is, as illustrated in FIG. 9, the image defect does not occur in the non-image area S2.

Figure 10:
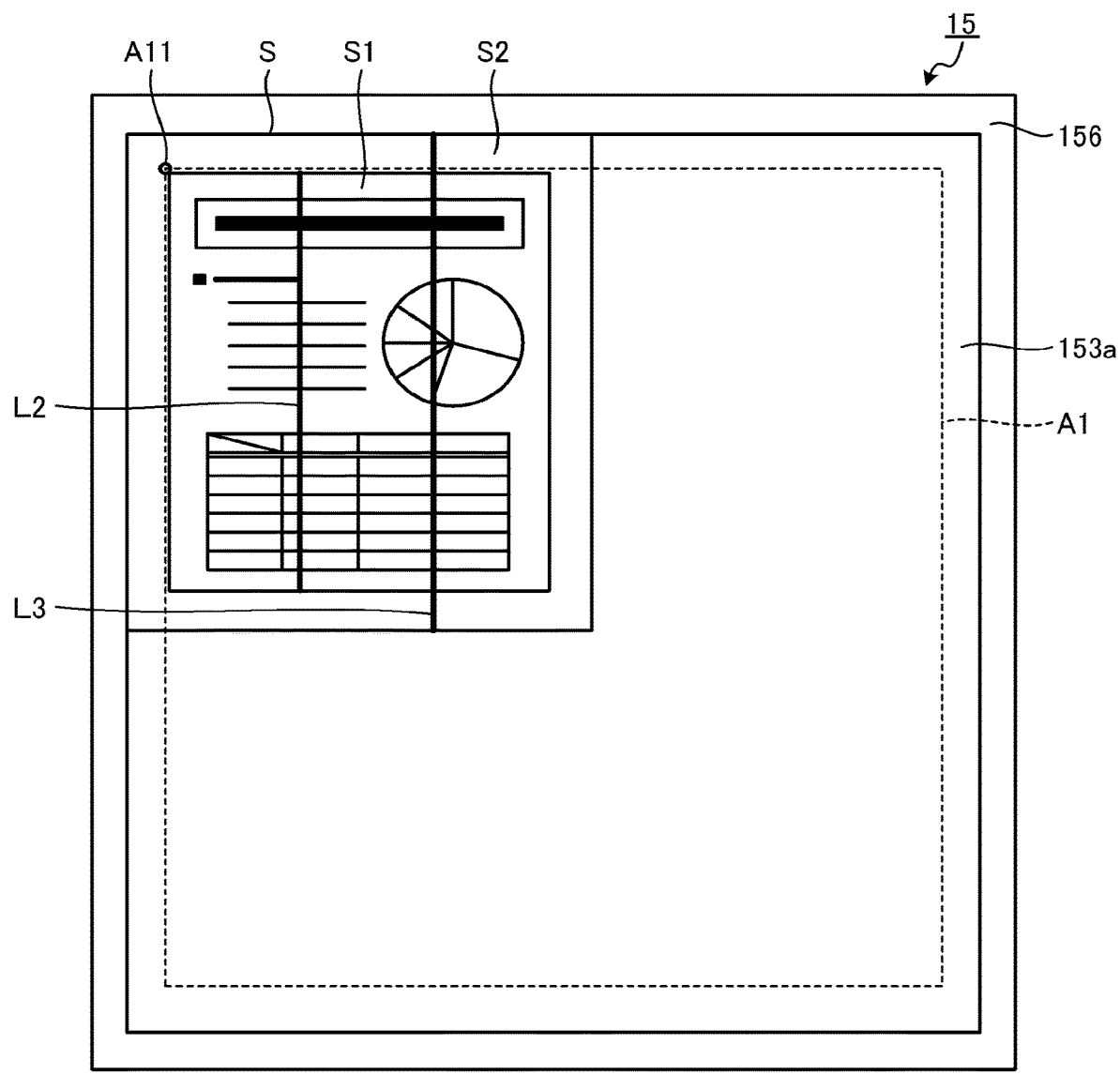
FIG. 10 is a diagram illustrating an example of a reading range of a document by the scanner illustrated in FIG. 2.

The reading device generally provided in image forming apparatuses is a platen reading device that reads a document by the manual stationary-document reading or an ADF stationary-document reading. When such a platen reading device is used, as described above with reference to FIG. 2, the document S is manually or automatically placed on the surface of the exposure glass 153a. Then, the platen reading device reads the document S with the reflection light using the light source and the sensor (the reduction optical system 152) disposed opposite the document S across the exposure glass 153a. FIG. 10 is a diagram illustrating an example of the document reading range of the scanner 15 illustrated in FIG. 2. In the scanner 15, on the surface (document mount face) of the exposure glass 153a, a first reading range A1 in which a read image is to be acquired is preset. The first reading range A1 is stored in the memory 12, for example. The first reading range A1 is generally used for reading the document S including the process of S102. As illustrated in FIG. 10, in a general platen, in order to prevent the specular reflection component from the document S, the light source or the sensor (the reduction optical system 152) is oblique to the surface of the exposure glass 153a (document mount face). Therefore, a shadow of a frame 156 may occur in the vicinity of the frame 156 on the document mount face. The read image may include this shadow. On the other hand, the non-image area S2, which is the area of the document S where the colorant is not or cannot be transferred, is a peripheral area of the image area S1 to be read. Accordingly, in order to prevent the shadow of the frame 156 from being reflected in the read image, an area offset from the frame 156 is set as the first reading range A1. More specifically, the first reading range A1 is, for example, an area surrounded by a broken line illustrated in FIG. 10, and is an area smaller than the surface of an exposure glass 153b of the platen. Further, the offset amount from the frame 156 is preferably smaller than the width of the non-image area S2. In this way, when the document S is read with the first reading range A1, an image of the document S within the first reading range A1 (predetermined range) is read.

However, as illustrated in FIG. 10, when the first reading range A1 offset from the frame 156 of the document mount face is used, the read image is not the image data of the entire document S. That is, it is not known whether or not the streak detected from the read image extends from the end (for example, the upper end) of the document S (diagnostic chart). In other words, when the first reading range A1 offset from the frame 156 is used, it is not known whether the streak detected from the read image is only in the image area S1 or also in the non-image area S2.

Figure 11:
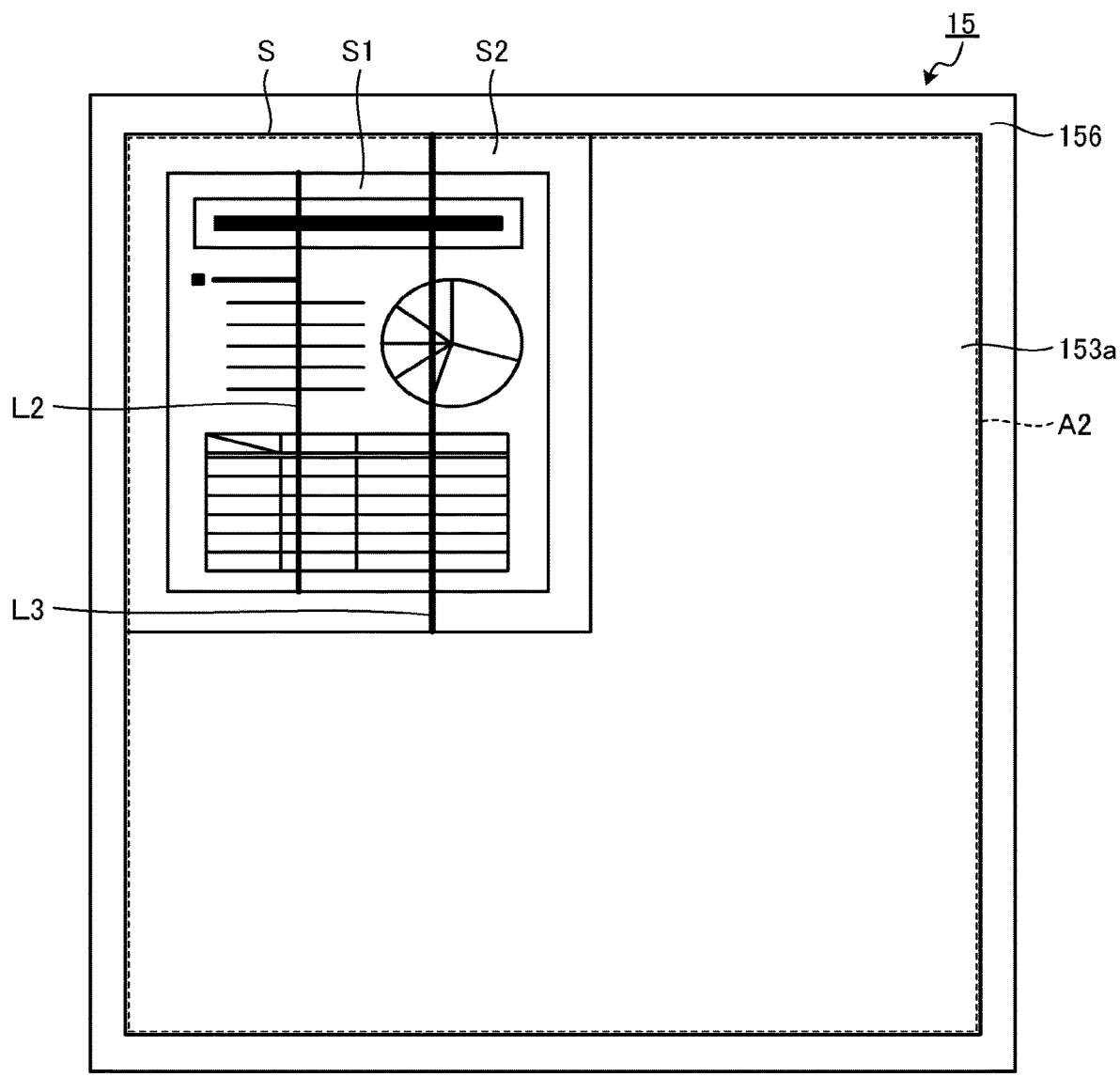
FIG. 11 is a diagram illustrating an example of a method of changing a reading range of the document by the scanner illustrated in FIG. 2.

Therefore, in response to a detection of an image defect at an end of the read image (S104: Yes), the rereading control unit 104 performs rereading to read an area of the diagnostic chart (document S) different from the first reading range A1. Specifically, in response to a determination that the streak extends from the upper end of the read image generated by reading of the first reading range A1 (S104: Yes), the reading method changing unit 106 changes the reading method of the diagnostic chart (S105a). More specifically, the reading method changing unit 106 changes the reading range of the scanner 15 from the first reading range A1. FIG. 11 is a diagram illustrating an example of the method of changing the reading range of the document S in the scanner 15 illustrated in FIG. 2. For example, as illustrated in FIG. 11, the reading method changing unit 106 sets the entire area of the surface (document mount face) of the exposure glass 153a as the second reading range A2. Then, the image reading unit 102 uses the second reading range A2 to reread the diagnostic chart (document S) in the same manner as S102 (S106).

The streak detection unit 103 detects an image defect from the read image obtained by rereading, in the same manner as the process of S103. Further, when an image defect (e.g., streak) is detected, the abnormal position determination unit 105 determines whether or not the detected image defect extends from the upper end of the read image in the same manner as the process of S104 (S107). On the other hand, in response to a determination that the image defect does not extend from the end of the read image (S104: No) subsequent to the detection of the image defect by the streak detection unit 103 in S103, the abnormal position determination unit 105 determines the image area S1 as the position of occurrence of the image defect (S107). That is, the process performed in S107 is identifying whether the image defect (e.g., streak) detected from the read image occurs only in the image area S1 or also in the non-image area S2. In other words, the process of S107 is identifying the position of occurrence of the streak. After that, the image diagnostic process ends.

As described above, the image diagnostic device 1 according to the present embodiment reads the document S (diagnostic chart). Further, when the streak is detected from the upper end of the read image of the diagnostic chart, the image diagnostic device 1 changes the reading range and performs rereading, that is, reads the document S in the range not offset from the document mount face. With this configuration, the image diagnostic device 1 can acquire the read image including the upper end of the diagnostic chart. Accordingly, the image diagnostic device 1 can determine whether or not the streak extends from the upper end of the diagnostic chart.

Figure 12:
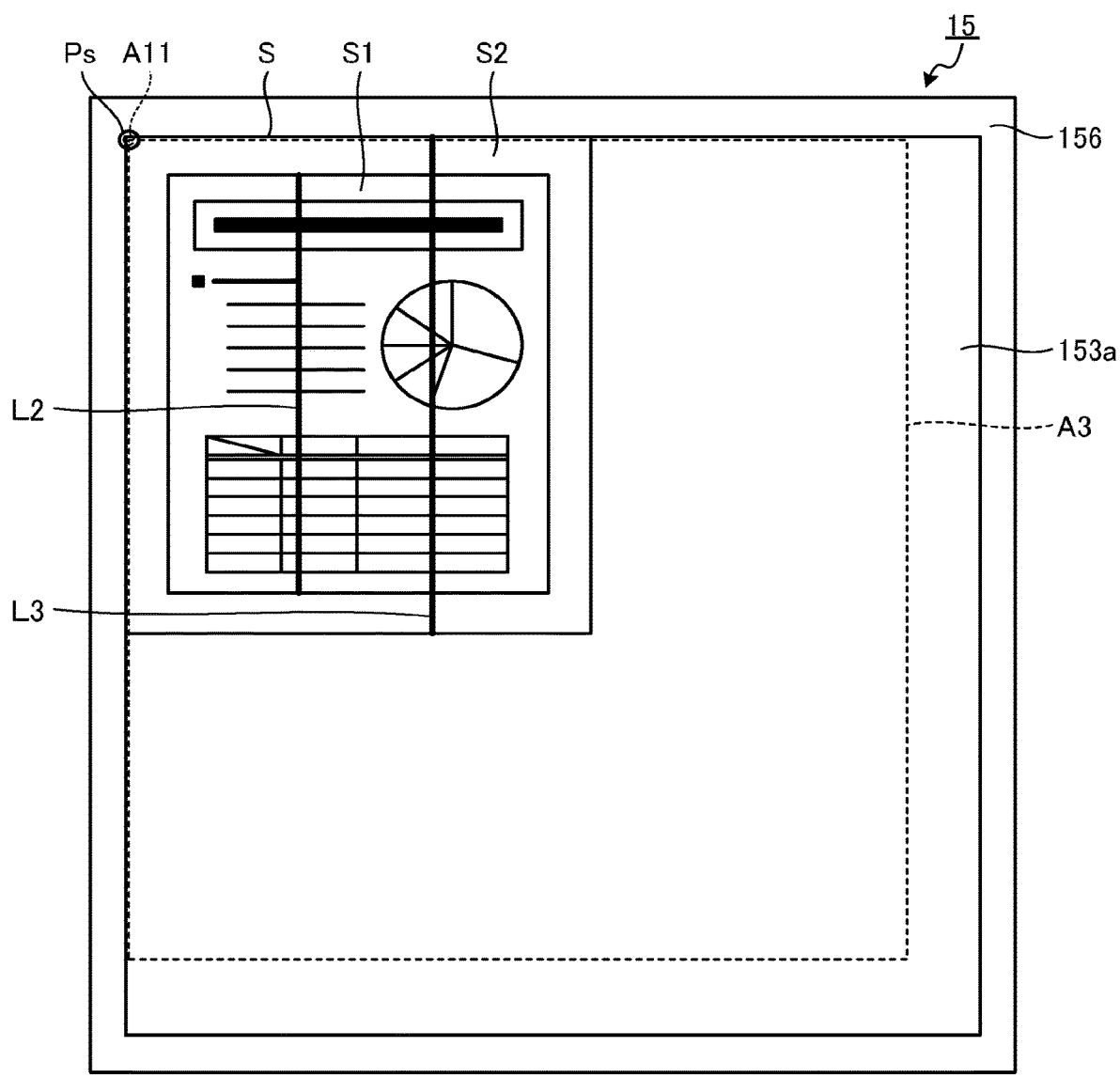
FIG. 12 is a diagram illustrating another example of the method of changing the reading range of the document by the scanner illustrated in FIG. 2.

FIG. 12 is a diagram illustrating another example of the method of changing the reading range of the document S in the scanner 15 illustrated in FIG. 2. In some cases, for example, the limitation of the capacity of the memory 12 prevents increases in the number of pixels to be stored. In such a case, as illustrated in FIG. 12, a third reading range A3 can be used. In the third reading range A3, the reading start position, that is, a corner A11 of the first reading range A1 in FIG. 10 is shifted to a document reference position Ps.

Identification of Defective Part

Next, the identification of the defective component executed in S12 illustrated in FIG. 5 is described in further detail. The defective component identification unit 201 acquires the position of the image defect (e.g., streak) from the image diagnostic device 1 when an image defect is detected in the image diagnostic process. The position of the image defect (e.g., streak) mentioned here is a position on the diagnostic chart (document S) at which the image defect is detected. When the position of the image defect is at the end of the diagnostic chart (document S), the defective component identification unit 201 identifies that a component relating to the cleaning process has a failure, for example, the cleaning blade 169 is damaged. On the other hand, when the image defect is not present at the end of the diagnostic chart (document S), the defective component identification unit 201 identifies that, for example, a component relating to the photoconductor drum 161 or the charging device 162 (e.g., a charging roller) has a failure.

As described above, detecting the image defect at the end of the image generated by reading the image area S1 (predetermined range), the failure diagnostic apparatus 2 according to the present embodiment changes the reading range on the document mount face, and performs rereading to generate a read image including the non-image area S2. According to this configuration, even when an image defect occurs outside the predetermined reading range, the cause of the defect can be appropriately identified.

Note that, in the present embodiment, as illustrated in FIG. 2, the scanner 15 reads a document by the manual stationary-document reading, but aspects of the present disclosure are applicable to configurations using a reading device of a different type. The technology according to the present embodiment is applicable to a scanner that employs any one of the manual stationary-document reading and the ADF stationary-document reading.

The scanner 15 can employ ADF conveyed-document reading or manual conveyed-document reading for normal document reading. For example, as illustrated in FIG. 2, the scanner 15 can be provided with an automatic document feeder (ADF) for the ADF conveyed-document reading. The ADF includes the exposure glass 153b and a background board 155b. The ADF includes a conveyor such as a roller to convey a document toward the exposure glass 153b. In this case, the reduction optical system 152 reads the conveyed document via the exposure glass 153b. In the reading operation of the document being conveyed by the ADF in the scanner 15, the first carriage 152d and the second carriage 152e are set stationary, for example, at home positions, and read the reflected light from the document when the document passes over the home positions. Further, the scanner 15 reads the reflected light from the background board 155b disposed, for example, right above the home positions, and performs gain adjustment and shading correction.

According to the above-described embodiment, a defective component can be correctly diagnosed even when the component causes an abnormality outside a reading range of a reading device.

Now, a description is given of a second embodiment of the present disclosure.

In the first embodiment, the description is given of rereading in the scanner 15 employing the manual stationary-document reading, and, in the rereading, the reading range on the document mount face is changed according to the position of the image defect on the document. In the present embodiment, the control of rereading in the scanner 15 employing ADF conveyed-document reading is described. In the following description, differences from the first embodiment are mainly described, and redundant description will be appropriately omitted.

Figure 13:
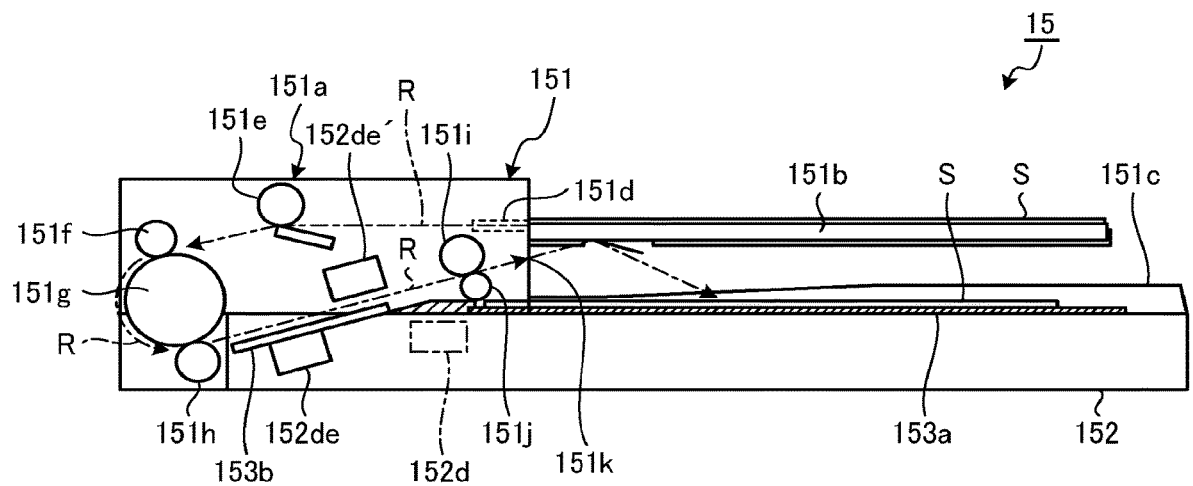
FIG. 13 is a schematic view illustrating another example of the configuration of the scanner illustrated in FIG. 1.

FIG. 13 is a schematic view illustrating another example of the configuration of the scanner 15 illustrated in FIG. 1.

As illustrated in FIG. 13, the scanner 15 according to the present embodiment is a sheet feeder scanner that reads a document being conveyed by the ADF (ADF conveyed-document reading).

As illustrated in FIG. 13, the cover 151 of the scanner 15 is provided with an ADF 151a, a document table 151b, a sheet feeding port 151d, a sheet outlet 151k, and a document output tray 151c. The document table 151b is a table on which standard size sheets can be placed. The ADF 151a guides one or a plurality of documents S from the top of a stack of documents on the document table 151b into the sheet feeding port 151d, separates the document S on the top from the rest with a separation unit 151e disposed behind the sheet feeding port 151d, and feeds the document S to a document conveyance passage R. In the ADF 151a, a plurality of conveyance rollers 151f, 151g, and 151h disposed in the middle of the document conveyance passage R reverse the fed document S so as to make a U-turn (a half turn) from the upper side to the lower side. Subsequently, the ADF 151a passes the reversed document S along the exposure glass 153b toward the sheet outlet 151k below the sheet feeding port 151d. The exposure glass 153b is uphill in a straight manner. Thus, the ADF 151a causes the document S to pass a predetermined image reading position. Subsequently, the ADF 151a ejects the document S that has passed by the image reading position on the exposure glass 153b from sheet outlet to the document output tray 151c by an ejection roller pair 151i and 151j. The document S after the image reading, which is ejected from the sheet outlet 151k, is stacked on the document output tray 151c. The number and position of the rollers for the reverse conveyance and the sheet ejection can be set according to the route setting conditions of the document conveyance passage R, the minimum size of the document S in the document conveyance direction, and the like.

The image reading unit 102 controls operates of the separation unit 151e, the plurality of conveyance rollers 151f, 151g, and 151h, and the ejection roller pair 151i and 151j, based on the plurality of sensors disposed on the document conveyance passage R and detection results thereof. That is, the image reading unit 102 loads the document S from the document table 151b, reversely conveys the document S such that the document S passes the reading position, and ejects the document S into the stack area on the document output tray 151c.

In addition, the image reading unit 102 controls the operation of an optical unit 152de based on a plurality of sensors disposed along the document conveyance passage R and the detection results thereof, so that optical unit 152de starts, at a predetermined timing, reading of the document S passing by the image reading position. Specifically, when the document S passes over the exposure glass 153b, the image reading unit 102 repeatedly performs line scanning with the optical unit 152de at the image reading position to read the image of the document S being conveyed. Here, the optical unit 152de is a unit including a light source and a sensor, and corresponds to, for example, the first carriage 152d and the second carriage 152e in FIG. 2.

The plurality of sensors disposed on the document conveyance passage R includes, for example, a sheet feeding proper position sensor, a sheet contact sensor, a document width sensor, a reading entry sensor, a registration sensor, and an ejection sensors, etc., which are disposed in order from the upstream side to the downstream side in the conveyance direction of the document S. Of course, a normal document S is an easily bendable sheet such as plain paper copier (PPC) and can form an image recording surface.

As illustrated in FIG. 13, the ADF 151a can further include an optical unit 152de' disposed on the upstream side of the exposure glass 153b in the inclination direction for the double-sided reading operation.

In a sheet feeder scanner that reads a document by the ADF conveyed-document reading or the manual conveyed-document reading, when an end of the document S is read, the end of the document S thus read appears as a line on the read image. Accordingly, the image reading unit 102 controls the reading timing so that the reading is started at a predetermined timing after the end of the document S has passed the image reading position (S102).

However, when the reading timing is controlled (offset) so that the end of the document S is not read, the read image is not the entire document S. That is, it is not known whether or not the streak detected from the read image extends from the end (for example, the upper end) of the document S (diagnostic chart). In other words, when the reading timing is controlled so as not to read the end of the document S, it is not known whether the streak detected from the read image is only in the image area S1 or also in the non-image area S2.

Figure 14:
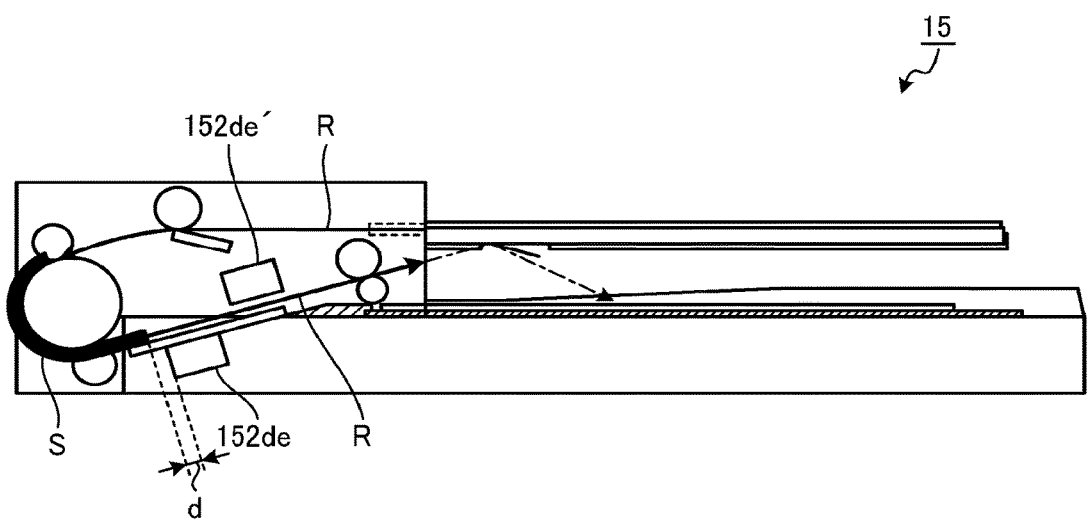
FIG. 14 is a diagram illustrating an example of a method of changing a reading range of the document by the scanner illustrated in FIG. 13.

Therefore, in response to a detection of an image defect at an end of the read image (S104: Yes), the rereading control unit 104 performs rereading to read an area of the diagnostic chart (document S) different from the predetermined reading range. Specifically, in response to a determination that the streak extends from the upper end of the read image generated by reading controlled not to read the end of the document S (S104: Yes), the reading method changing unit 106 changes the reading method of the diagnostic chart (S105a). FIG. 14 is a diagram illustrating an example of the method of changing the reading range of the document S in the scanner 15 illustrated in FIG. 13. As illustrated in FIG. 14, the reading method changing unit 106 changes the reading timing so that the reading starts immediately before the document S (diagnostic chart) reaches the image reading position of the optical unit 152de while the document S moves along the document conveyance passage R. In the example illustrated in FIG. 14, the reading method changing unit 106 changes the reading timing so that the reading is started when the end of the document S reaches the position upstream by a distance d from the image reading position. After that, the image reading unit 102 performs rereading of the diagnostic chart (document S) at the changed reading timing in the same manner as S102 (S106).

As described above, the image diagnostic device 1 according to the present embodiment reads the document S (diagnostic chart), and, when the streak is detected from the upper end of the read image of the diagnostic chart, changes the reading timing, and performs rereading to read the document S without offset. With this configuration, the image diagnostic device 1 can acquire the read image including the upper end of the diagnostic chart. Accordingly, the image diagnostic device 1 can determine whether or not the streak extends from the upper end of the diagnostic chart, similar to the first embodiment.

Note that, in the present embodiment, as illustrated in FIG. 13, the scanner 15 reads a document by the ADF conveyed-document reading, but aspects of the present disclosure are applicable to configurations using a reading device of a different type. The technology according to the present embodiment is applicable to the scanner 15 that employs any one of the ADF conveyed-document reading and the manual conveyed-document reading. Further, the scanner 15 can employ manual stationary-document reading or ADF stationary-document reading for normal document reading.

A third embodiment is described below.

In the first embodiment, the description is given of rereading in the scanner 15 employing the manual stationary-document reading, and, in the rereading, the reading range on the document mount face is changed according to the position of the image defect on the document. In the present embodiment, a description is given of control of rereading in which, instead of changing the reading range of the scanner 15, the user is urged to change the position of the document S placed on the document mount face. In the following description, differences from the first embodiment are mainly described, and redundant description will be appropriately omitted.

Figure 15:
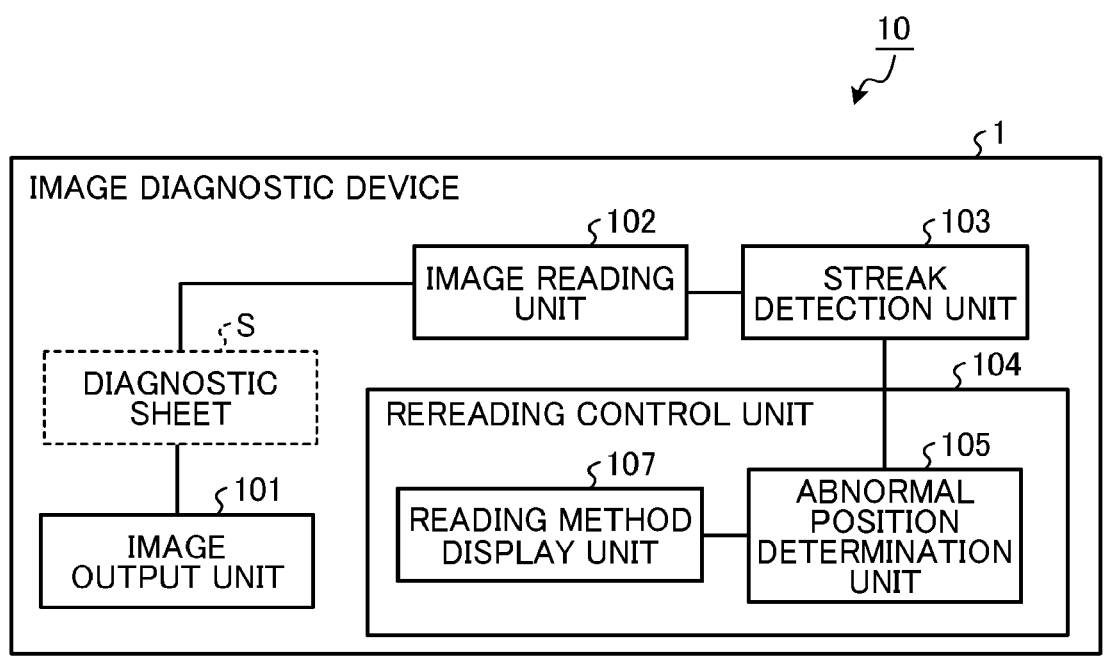
FIG. 15 is a block diagram illustrating another example of the functional configuration of the image diagnostic device implemented by the image forming apparatus illustrated in FIG. 1.

FIG. 15 is a block diagram illustrating another example of the functional configuration of the image diagnostic device 1 implemented by the image forming apparatus 10 illustrated in FIG. 1. The rereading control unit 104 controls rereading. The rereading is reading a range of the diagnostic chart different from the predetermined reading range thereof in response to a detection of an image defect appearing at an end of the read image. The rereading control unit 104 according to the present embodiment includes functions of the abnormal position determination unit 105 and a reading method display unit 107.

The reading method display unit 107 displays a prompt to change the reading method of the diagnostic chart when the position of the image defect is within the predetermined range. Specifically, the reading method display unit 107 displays, on the display 13, a display screen including an instruction to change the position of the document S on the document mount face, according to the reread range.

Figure 16:
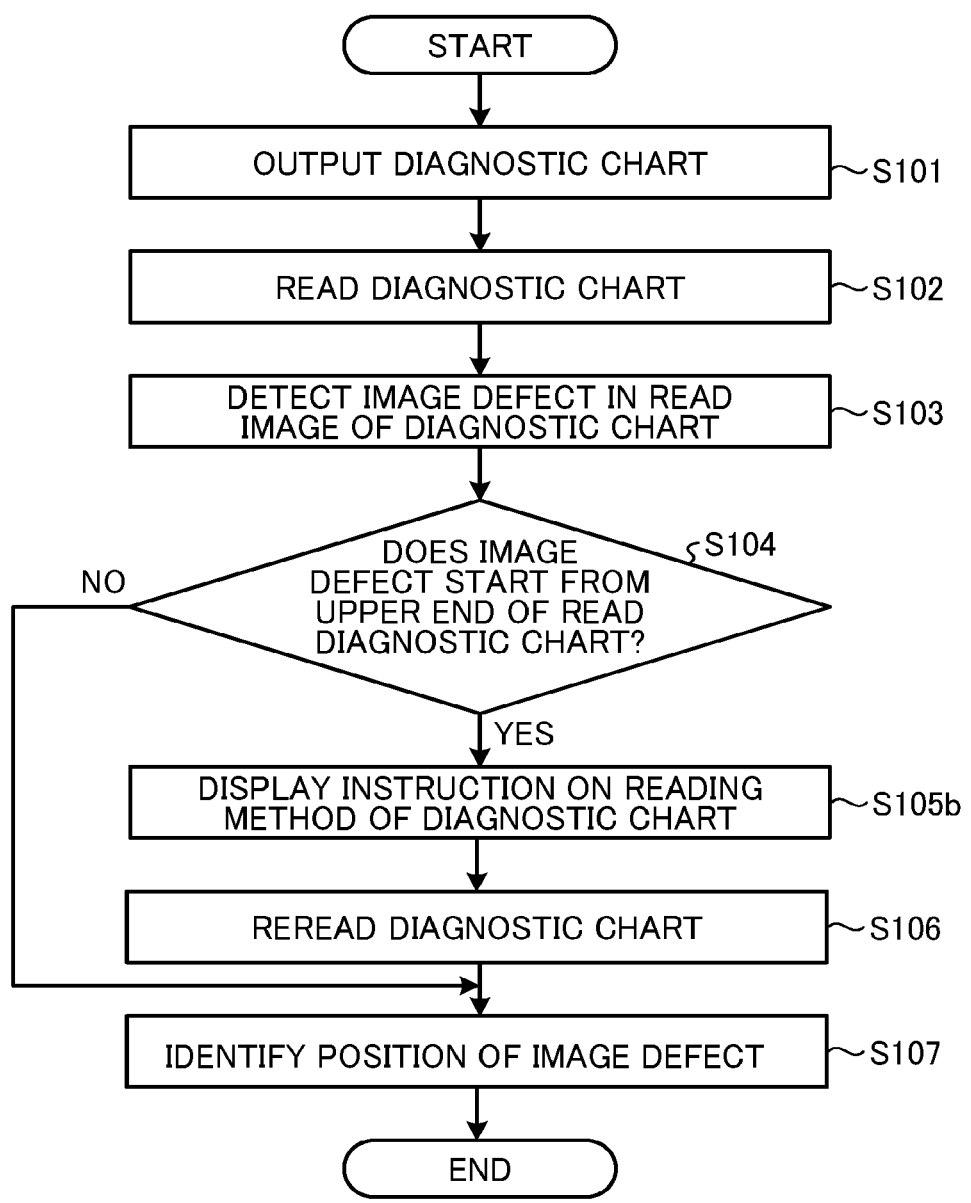
FIG. 16 is a flowchart illustrating an example of an image diagnostic process executed by the image diagnostic device illustrated in FIG. 15.

FIG. 16 is a flowchart illustrating an example of an image diagnostic process executed by the image diagnostic device 1 illustrated in FIG. 15. When an image defect is detected at an end of the read image (S104: Yes), the rereading control unit 104 controls rereading for reading a range different from the predetermined range in the diagnostic chart (document S). Specifically, in response to a determination that the streak extends from the upper end of the read image generated by reading of the first reading range A1 (S104: Yes), the reading method display unit 107 displays a display screen for instructing a change of the method of reading of the diagnostic chart (S105b).

Figure 17:
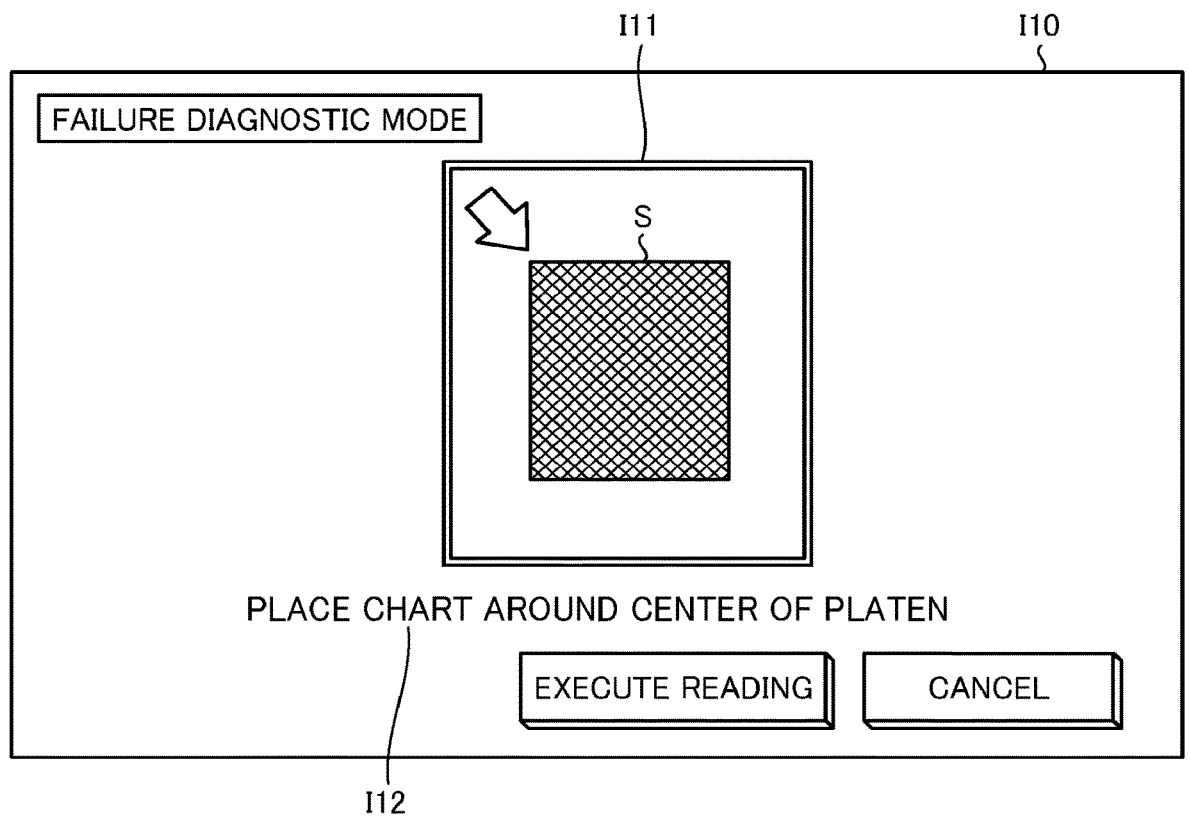
FIG. 17 is a diagram illustrating an example of a display screen in the image diagnostic process illustrated in FIG. 16 and includes an instruction to change document position.

FIG. 17 is a diagram illustrating an example of a display screen I10 that is displayed in the image diagnostic process illustrated in FIG. 16 and includes an instruction to change the position of the document. As illustrated in FIG. 17, the display screen I10 includes a position change instruction to place the diagnostic chart, for example, near the center of the platen so that the end (upper end) of the document S (diagnostic chart), that is, the non-image area S2, is included in the first reading range A1. Examples of the position change instruction include an indication I11 such as an illustration or a graphic, and a message I12 such as "place the chart near the center of the platen." The position change instruction can be any instruction to place the diagnostic chart so that the upper end of the diagnostic chart is included in the read image. The position change instruction can be either one of the indication I11 and the message I12.

After that, the image reading unit 102 rereads the diagnostic chart in response to the change of the position of the document S by the user (S106). The change of the position of the document S by the user is detected, for example, in response to the operation of the "execute reading" button on the display screen I10. In a configuration in which the display 13 does not include a touch panel, the display screen I10 may include an operation method for the user to instruct the start of rereading.

As described above, the image diagnostic device 1 according to the present embodiment reads the document S (diagnostic chart), and, when the streak is detected from the upper end of the read image of the diagnostic chart, displays a display screen for prompting the user to change the position of the document S, and performs rereading to read the document S whose placement position is changed by the user. With this configuration, the image diagnostic device 1 can acquire the read image including the upper end of the diagnostic chart. Accordingly, the image diagnostic device 1 can determine whether or not the streak extends from the upper end of the diagnostic chart, similar to the first embodiment.

Note that, in the present embodiment, the scanner 15 reads a document by the manual stationary-document reading, but aspects of the present disclosure are applicable to configurations using a reading device of a different type. The technology according to the present embodiment is applicable to the scanner 15 that employs either the manual stationary-document reading or the manual conveyed-document reading. For example, when the technology according to the present embodiment is applied to the scanner 15 that employs the manual conveyed-document reading, the reading method display unit 107 displays a display screen including an instruction to change the timing of moving of the document S so that the upper end of the diagnostic chart is included in the read image. Further, the scanner 15 can employ ADF stationary-document reading or ADF conveyed-document reading for normal document reading.

For example, the image diagnosis program executed by the image diagnostic device 1 and the failure diagnosis program executed by the failure diagnostic apparatus 2 according to each of the above-described embodiments are provided in advance in a ROM or the like.

Alternatively, the image diagnosis program executed by the image diagnostic device 1 and the failure diagnosis program executed by the failure diagnostic apparatus 2 according to each of the above-described embodiments may be in a file format installable or executable by a computer and stored in a computer-readable recording medium, such as a compact disc read only memory (CD-ROM), a flexible disk (FD), a compact disc recordable (CD-R), and a digital versatile disk (DVD).

Yet alternatively, the image diagnosis program executed by the image diagnostic device 1 and the failure diagnosis program executed by the failure diagnostic apparatus 2 according to each of the above-described embodiments may be stored in a computer connected to a network such as the Internet and downloaded through the network. Further, the image diagnosis program executed by the image diagnostic device 1 and the failure diagnosis program executed by the failure diagnostic apparatus 2 according to each of the above embodiments may be provided or distributed via a network such as the Internet.

The image diagnosis program executed by the image diagnostic device 1 and the failure diagnosis program executed by the failure diagnostic apparatus 2 according to each of the above embodiments are in s modular configuration including the above-described units (the image output unit 101, the image reading unit 102, the streak detection unit 103, the rereading control unit 104, the abnormal position determination unit 105, the reading method changing unit 106, the reading method display unit 107, and the defective component identification unit 201). As the CPU (a processor) reads the program from the ROM and executes the program, the above-described functional units (the image output unit 101, the image reading unit 102, the streak detection unit 103, the rereading control unit 104, the abnormal position determination unit 105, the reading method changing unit 106, the reading method display unit 107, and the defective component identification unit 201) are loaded and implemented (generated) as hardware in a main memory.

The technology according to each of the above-described embodiments is applicable to any image forming apparatus, such as a copier, a printer, a scanner, and a facsimile, which has at least a printer function and a scanner function. The printer function and the scanner function may be implemented by different apparatuses.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image diagnostic device comprising circuitry configured to:
output a diagnostic chart for image defect detection;
read a predetermined reading range of the diagnostic chart;
output a read image based on reading of the predetermined reading range;
detect an image defect in the diagnostic chart based on the read image;
determine whether the image defect is at an end of the read image; and,
in response to a determination that the image defect is at the end of the read image, control rereading to read a rereading range of the diagnostic chart different from the predetermined reading range.

2. The image diagnostic device according to claim 1,
wherein the predetermined reading range includes an image area of the diagnostic chart, and
wherein the circuitry is configured to:
determine whether the image defect is at an end of the image area; and
control the rereading in response to a determination that the image defect is at the end of the image area.

3. The image diagnostic device according to claim 2,
wherein the rereading range includes a non-image area at a periphery of the image area of the diagnostic chart.

4. The image diagnostic device according to claim 1,
wherein the circuitry is configured to change a range of a document mount face to be read, to change the rereading range.

5. The image diagnostic device according to claim 1,
wherein the circuitry is configured to change a timing of start of reading of the diagnostic chart in accordance with the rereading range.

6. The image diagnostic device according to claim 1,
wherein the circuitry is configured to display an instruction to change a position of the diagnostic chart on a document mount face.

7. A failure diagnostic apparatus comprising:
the image diagnostic device according to claim 1; and
circuitry configured to identify a defective component, as an origin of the image defect, according to a position of the image defect in the diagnostic chart detected by the image diagnostic device.

8. A diagnostic method comprising:
outputting a diagnostic chart for image defect detection;
reading a predetermined reading range of the diagnostic chart;
outputting a read image based on reading of the predetermined reading range;
detecting an image defect in the diagnostic chart based on the read image;
determining whether the image defect is at an end of the read image; and
in response to a determination that the image defect is at the end of the read image, controlling rereading to read a rereading range of the diagnostic chart different from the predetermined reading range.

9. The diagnostic method according to claim 8,
wherein the predetermined reading range includes an image area of the diagnostic chart, and
wherein the method further comprises:
determining whether the image defect is at an end of the image area; and
controlling the rereading in response to a determination that the image defect is at the end of the image area.

10. The diagnostic method according to claim 9,
wherein the rereading range includes a non-image area at a periphery of the image area of the diagnostic chart.

11. The diagnostic method according to claim 8,
wherein the controlling rereading includes changing a range of a document mount face to be read, to change the rereading range.

12. The diagnostic method according to claim 8,
wherein the controlling rereading includes changing a timing of start of reading of the diagnostic chart in accordance with the rereading range.

13. The diagnostic method according to claim 8, further comprising displaying an instruction to change a position of the diagnostic chart on a document mount face.

14. The diagnostic method according to claim 8, further comprising identifying a defective component, as an origin of the image defect, according to a position of the image defect in the detected diagnostic chart.

15. A non-transitory recording medium storing a plurality of program codes which, when executed by one or more processors, causes the processors to perform a method, the method comprising:
outputting a diagnostic chart for image defect detection;
reading a predetermined reading range of the diagnostic chart;
outputting a read image based on reading of the predetermined reading range;
detecting an image defect in the diagnostic chart based on the read image;
determining whether the image defect is at an end of the read image; and in response to a determination that the image defect is at the end of the read image, controlling rereading to read a rereading range of the diagnostic chart different from the predetermined reading range.

16. The non-transitory recording medium according to claim 15,
wherein the predetermined reading range includes an image area of the diagnostic chart, and
wherein the method further comprises:
determining whether the image defect is at an end of the image area; and
controlling the rereading in response to a determination that the image defect is at the end of the image area.

17. The non-transitory recording medium according to claim 16,
wherein the rereading range includes a non-image area at a periphery of the image area of the diagnostic chart.

18. The non-transitory recording medium according to claim 15,
wherein the controlling rereading includes changing a range of a document mount face to be read, to change the rereading range.

19. The non-transitory recording medium according to claim 15,
wherein the controlling rereading includes changing a timing of start of reading of the diagnostic chart in accordance with the rereading range.

20. The non-transitory recording medium according to claim 15,
wherein the method further comprises displaying an instruction to change a position of the diagnostic chart on a document mount face.

* * * * *